(12) United States Patent
Eriksson et al.

(10) Patent No.: US 9,089,939 B2
(45) Date of Patent: Jul. 28, 2015

(54) DRILLING UNIT WITH AUTOMATIC DRILL SHAFT FEEDING, AND METHOD AND MEANS THERETO

(75) Inventors: Ulf Mikael Eriksson, Valentuna (SE); Wilhelm Mattias Jacobsson, Trangsund (SE)

(73) Assignee: ATLAS COPCO INDUSTRIAL TECHNIQUE AKTIEBOLAG, Stockholm (SE)

( * ) Notice: Subject to any disclaimer, the term of this patent is extended or adjusted under 35 U.S.C. 154(b) by 855 days.

(21) Appl. No.: 13/127,292

(22) PCT Filed: Nov. 4, 2009

(86) PCT No.: PCT/SE2009/000487
§ 371 (c)(1),
(2), (4) Date: Jun. 2, 2011

(87) PCT Pub. No.: WO2010/053421
PCT Pub. Date: May 14, 2010

(65) Prior Publication Data
US 2011/0236144 A1    Sep. 29, 2011

(30) Foreign Application Priority Data
Nov. 4, 2008 (SE) ....................... 0802340

(51) Int. Cl.
*B23Q 5/48* (2006.01)
(52) U.S. Cl.
CPC . *B23Q 5/48* (2013.01); *Y10T 74/19* (2015.01); *Y10T 74/1956* (2015.01); *Y10T 74/19647* (2015.01); *Y10T 408/14* (2015.01); *Y10T 408/16* (2015.01); *Y10T 408/165* (2015.01); *Y10T 408/17* (2015.01); *Y10T 408/172* (2015.01); *Y10T 408/65* (2015.01); *Y10T 408/68* (2015.01); *Y10T 408/73* (2015.01)

(58) Field of Classification Search
CPC ....................................................... B23Q 5/48
USPC ............... 408/124, 138, 141, 6, 10, 11, 8, 9; 173/216, 217, 29, 213; 74/412 R, 413, 74/414, 421 R, 393, 401, 405, 406
See application file for complete search history.

(56) References Cited

U.S. PATENT DOCUMENTS

| | | | | |
|---|---|---|---|---|
| 1,596,718 A | * | 8/1926 | Cleveland | 408/11 |
| 1,775,406 A | * | 9/1930 | Norling | 74/129 |
| 2,040,872 A | * | 5/1936 | Oberhoffken | 408/10 |
| 2,060,158 A | * | 11/1936 | Yager et al. | 29/38 C |
| 2,096,754 A | * | 10/1937 | Oberhoffken et al. | 74/665 R |
| 2,479,622 A | * | 8/1949 | Johnson | 451/151 |
| 3,029,661 A | * | 4/1962 | Schmitter | 74/606 R |

(Continued)

FOREIGN PATENT DOCUMENTS

CN    2850805 Y    12/2006

OTHER PUBLICATIONS

International Search Report dated Jan. 19, 2010 issued in International Appln. No. PCT/SE2009/000487-.

*Primary Examiner* — Daniel Howell
*Assistant Examiner* — Chwen-Wei Su
(74) *Attorney, Agent, or Firm* — Holtz, Holtz, Goodman & Chick PC

(57) ABSTRACT

A drilling unit with automatic drill shaft feeding is provided. The feeding velocity can be changed by external mounting of exchangeable gearing cassettes having a desired gear ratio.

4 Claims, 1 Drawing Sheet

(56) References Cited

U.S. PATENT DOCUMENTS

| | | | |
|---|---|---|---|
| 3,645,153 A * | 2/1972 | Northcraft | 74/370 |
| 3,679,320 A | 7/1972 | Bohorquez et al. | |
| 3,794,436 A * | 2/1974 | Rowlett | 408/124 |
| 4,594,030 A | 6/1986 | Weigel, Jr. | |
| 4,607,601 A * | 8/1986 | Kohler | 123/90.31 |
| 4,650,376 A * | 3/1987 | Miyakawa | 408/42 |
| 4,890,962 A | 1/1990 | Nydegger | |
| 6,343,900 B1 | 2/2002 | Bruno | |

* cited by examiner

DRILLING UNIT WITH AUTOMATIC DRILL SHAFT FEEDING, AND METHOD AND MEANS THERETO

This application is a U.S. National Phase Application under 35 USC 371 of International Application PCT/SE2009/00487 filed Nov. 4, 2009.

FIELD OF INVENTION

The present invention relates to a drilling unit with automatic drill shaft feeding, and more precisely a method and means for changing the drill shaft feeding velocity in such a drilling unit.

BACKGROUND OF THE INVENTION

These type of drilling units are used e.g. when drilling holes when building of aircraft fuselage. The drilling units are mounted in frames or boring jigs, which are moved between the different boring sites. Depending on the type of material that is processed, and also material thickness, there is a need for varying the automatic drill shaft feeding velocity. According to prior art, the drilling units have to be rebuilt in order to obtain different feeding velocities. One reason for this is that the drilling units have to be kept small because of the mostly narrow working space around an aircraft fuselage. Thus, a gearbox built into the unit would make it too large. There is a need for drilling units with variable automatic drill shaft feeding velocities.

SUMMARY OF THE INVENTION

One object of the invention is thus to provide a method for changing the drill shaft feeding velocity in drilling units with automatic drill shaft feeding, which allows for a quick, secure and comfortable change of the feeding velocity.

Another object of the invention is to provide a means for performing the method according to the invention.

A further object of the invention is a drilling unit with automatic drill shaft feeding being equipped with said means for performing the method according to the invention. These and other objects are achieved with the method according to the present invention, comprising providing a gearing cassette with a requested gear ratio; mounting of said cassette having one input coupling part and one output coupling part, each connected to a gear adapted to transform the rotational speed transferred to the input coupling part into a desired output rotational speed on the output coupling part, on a corresponding output axle (coupling part) on the drill shaft feeding gearbox and a corresponding input axle (coupling part) connected to a feeding mechanism for the drill shaft, respectively, said coupling parts being fitted with suitable interconnection means. Preferably, a number of gearing cassettes having different, predetermined gear ratios are provided.

The means for performing the method according to the invention being a gearing cassette comprising a housing, two mutually meshed gears provided in said housing providing a desired gear ratio, one gear being arranged to be coupled to an output axle (coupling part) on a gear box of the drilling unit, and the other gear being arranged to be coupled to an input axle (coupling part) on the drilling unit, which is connected to said drill shaft feeding mechanism.

A drilling unit with automatic drill shaft feeding according to the invention is adapted to be equipped with an exchangeable and detachable gearing cassette having a desired gear ratio, having an output axle (coupling part) from the gearbox to be coupled to one of the gears in said gearing cassette, and having an input axle (coupling part) to be coupled to the other of the gears in said gearing cassette, which input axle (coupling part) is coupled to the drill shaft feeding mechanism.

BRIEF DESCRIPTION OF DRAWINGS

Further objects, advantages and features of the invention will be apparent from the following detailed description relating to one embodiment of the invention shown in the accompanying drawing, in which.

DESCRIPTION OF PREFERRED EMBODIMENTS

Figure 1:
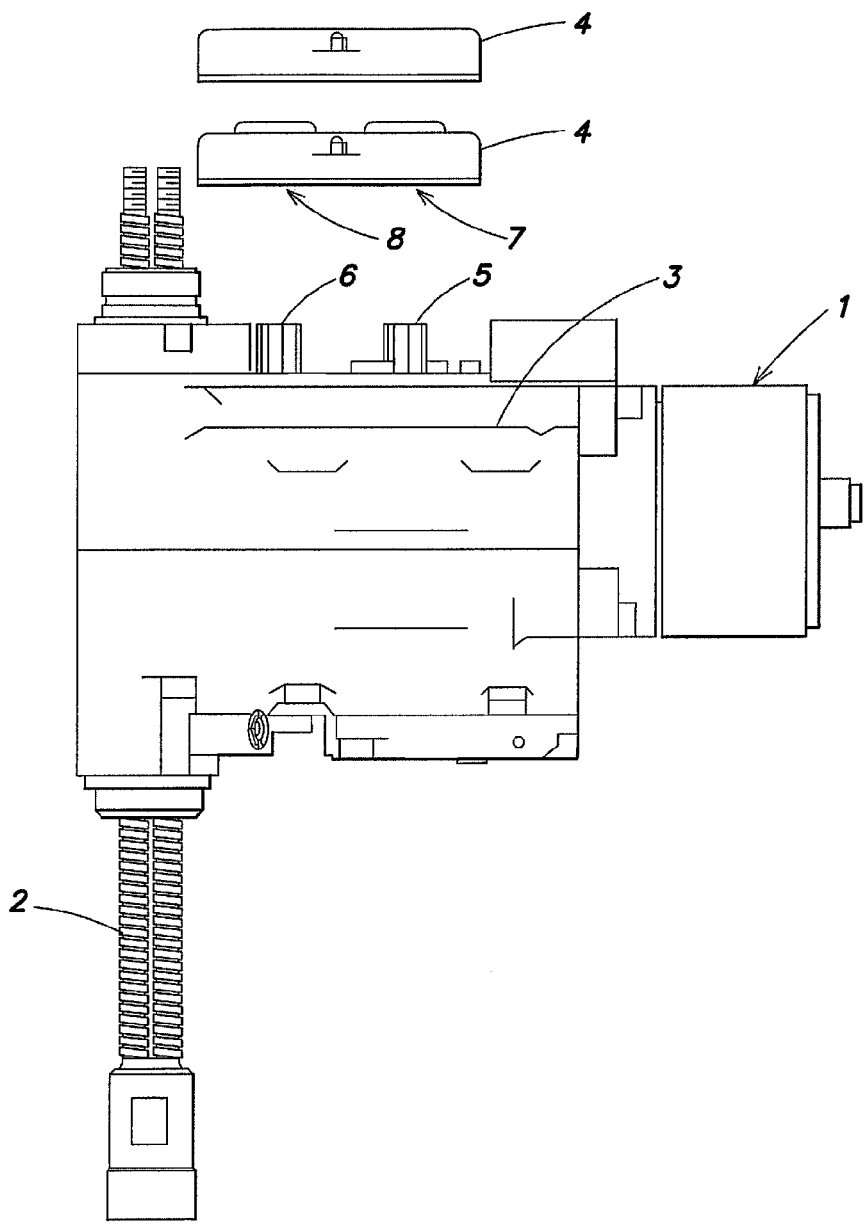
FIG. 1 shows a schematic view of a drilling unit with automatic drill shaft feeding.

In FIG. 1, a drilling unit is shown very schematically. A motor unit 1 drives a drilling shaft 2 through a gearbox 3, and said motor unit 1 also powers the automatic drill shaft feeding through the gearbox. As mentioned in the preamble of this specification, prior art drilling units have to be rebuilt in order to change the drill shaft feeding velocity. This means that the whole unit must be disassembled, gears must be exchanged, and the unit assembled once more.

In order to eliminate this problem and make quick and easy changes of the feeding velocity possible, the drilling unit is provided with an exchangeable gearing cassette 4, which is mounted on the outside of the drilling unit, and which is connected between an output axle (coupling part) 5 from the gearbox, and an input axle (coupling part) 6 connected to the drill shaft feeding mechanism.

A number of gearing cassettes 4 would normally be provided, each having a desired gear ratio for a certain application. Any number of cassettes could be provided, covering a broad spectrum of gear ratios.

Figure 2:
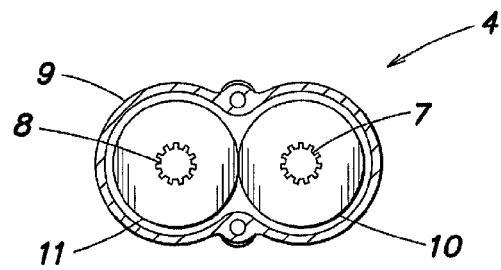
FIG. 2 shows a schematic cross sectional view of a gearing cassette according to the invention.

As shown in FIG. 2 the gearing cassette comprises a housing 9, mutually meshed gears 10, 11 in the housing having coupling parts 7, 8 to be coupled to the above mentioned axles (coupling parts) on the drilling unit. In order to obtain a desired gear ratio, the gearing cassettes might comprise more than two gears.

The coupling between the gears in the gearing cassette and the axles (coupling parts) on the drilling unit is not critical to the invention, and the man skilled in the art related to coupling of two rotary axles (coupling parts) to each other is capable of designing a number of different equivalent solutions. In the schematic drawing is illustrated two axles sticking out of the gearbox of the drilling unit designed as male coupling parts to be inserted into female coupling parts in the gearing cassette. Of course, this can be made the other way around with axle parts sticking out of the gearing cassettes.

To make the mounting of the gearing cassettes easy and secure, a coupling involving splines might be used.

A great advantage achieved with the invention is that the suggested solution neither adds substantial weight nor volume to the drilling unit, together with the fact that the exchange of gearing cassettes is quick and simple.

The invention claimed is:

1. A set comprising:
A plurality of exchangeable gearing cassettes with different gear ratios for changing a drill shaft rotation velocity of a gearbox in a drilling unit, wherein said gearbox is provided with an output coupling part and an input coupling part, wherein each of said cassettes is detachably mountable on an outside of said gearbox, and wherein each of said cassettes comprises:

a housing;

at least two meshed gearings with a certain gear ratio which are provided in said housing;

an input coupling part and an output coupling part which are each connected to respective ones of said gearings; and interconnecting means for connecting said input coupling part of said cassette directly to said output coupling part of said gearbox, and for connecting said output coupling part of said cassette directly to said input coupling part of said gearbox, for adapting a total gear ratio of said gearbox to a given unit application;

wherein said gearings are provided in said housing of said cassette such that said gearings are removed from the gearbox together with said housing of said cassette when said cassette is detached from the gearbox.

2. A drilling unit comprising:

a motor;

a drilling shaft;

a gearbox coupling the motor to the drilling shaft, wherein the gearbox comprises an output coupling part and an input coupling part; and a gearing cassette which is mounted to an outside of the gearbox, wherein said gearing cassette comprises a housing and a gearing with a certain gear ratio which is provided in said housing, and said gearing cassette is arranged to connect said output coupling part of said gearbox to said input coupling part of said gearbox;

wherein said gearing cassette is detachable from the outside of the gearbox, and wherein said gearing is provided in said housing of said gearing cassette such that said gearing is removed from the gearbox together with said housing of said gearing cassette when said gearing cassette is detached from the gearbox, and wherein said gearing cassette comprises one of a number of exchangeable gearing cassettes with different gear ratios for adapting a total gear ratio of the gearbox to different unit applications.

3. The drilling unit according to claim 2, wherein the gearing of said cassette comprises two gears, one of which is connectable to said output coupling part of said gearbox, the other of which is connectable to said input coupling part of said gearbox.

4. The drilling unit according to claim 3, wherein quick coupling means is provided to facilitate connection of said two gears to said output coupling part of said gearbox and said input coupling part of said gearbox at changing of the gearing cassette.

\* \* \* \* \*